United States Patent [19]

Mori et al.

[11] Patent Number: 4,956,031

[45] Date of Patent: Sep. 11, 1990

[54] METHOD OF MANUFACTURING AN ELONGATED ELECTROLUMINESCENCE ELEMENT

[75] Inventors: Kiju Mori, Tokyo; Nobuhisa Kanemitsu, Kanagawa, both of Japan

[73] Assignee: Stanley Electric Co., Ltd., Tokyo, Japan

[21] Appl. No.: 314,034

[22] Filed: Feb. 23, 1989

[30] Foreign Application Priority Data

Mar. 5, 1988 [JP] Japan .................................. 63-52326

[51] Int. Cl.$^5$ .............................................. B32B 31/08

[52] U.S. Cl. ...................................... 156/67; 156/250; 156/324; 313/506; 313/509; 313/512; 428/690; 428/917

[58] Field of Search ......................... 156/67, 250, 324; 313/504, 506, 505, 512; 428/690, 917

[56] References Cited

U.S. PATENT DOCUMENTS 2,341,583 2/1944 Tyre .................................... 156/324
3,197,664 7/1965 Sentementes et al. .
3,376,177 4/1968 Bowser et al. ....................... 156/324
3,393,555 1/1976 Downey .............................. 156/324
3,395,058 7/1968 Kennedy ............................... 156/67
3,571,647 3/1971 Robinson ............................ 313/509
4,357,557 11/1982 Inohara et al. ....................... 313/509
4,647,337 3/1987 Simopoulos et al. ............... 313/506
4,792,500 12/1988 Kojima ................................ 428/690

*Primary Examiner*—Caleb Weston
*Attorney, Agent, or Firm*—Nixon & Vanderhye

[57] ABSTRACT

An elongated EL element and a manufacturing method thereof. An elongated substrate has a back electrode, an insulating layer and a luminescent layer which are superimposed upon each other. A transparent conductive film is superimposed upon the substrate. An auxiliary electrode narrower in width than that of each of the substrate and the transparent conductive film has an insulating film, a conductive metal layer and a conductive adhesive layer which are superimposed upon each other. The auxiliary electrode is sandwiched between the substrate and the transparent conductive film superimposed one upon the other, and extends longitudinally of the substrate and the transparent conductive film, wherein the insulating film is in contact with the luminescent layer of the substrate, while the conductive adhesive layer is bonded to the transparent conductive film. An assembly of the substrate, the transparent conductive film and the auxiliary electrode is covered sealingly with dampproof film material.

12 Claims, 2 Drawing Sheets

METHOD OF MANUFACTURING AN ELONGATED ELECTROLUMINESCENCE ELEMENT

BACKGROUND OF THE INVENTION

The present invention relates to an elongated electroluminescence element (hereinafter referred to as "EL element") and a method of manufacturing the elongated EL element.

An EL element useful as a face light source for various display instruments is known as shown in FIG. 6 of the accompanying drawings. The known EL element 1 comprises a substrate which is generally composed of a back electrode 2, an insulating layer 3 formed on one side of the back electrode 2, and a luminescent layer 4 formed on the other side of the insulating layer 3. The back electrode 2 is formed of, for example, an aluminum foil. The insulating layer 3 contains dielectric powder such as, for example, barium titanate ($BaTiO_3$) or the like. The luminescent layer 4 contains fluorescent material such as, for example, zinc sulfide (ZnS) or the like. A transparent conductive film 5 is provided which is formed is such a manner that indium tin oxide (ITO) is vacuum-deposited onto one side of a polyester film or the like. The transparent conductive film 5 is thermocompression-bonded onto the luminescent layer 4 of the substrate such that the vacuum-deposited ITO membrane is in contact with the luminescent layer 4. Subsequently, an assembly of the substrate and the transparent conductive layer 4 is sealingly covered with a pair of dampproof films 6 and 6 by means of thermocompression bonding or the like. Thus, the EL element is formed. The arrangement is such that when voltage is applied between the back electrode 2 and the transparent conductive film 5, an electric field is generated in the electroluminescence material consisting of the insulating layer 3 and the luminescent layer 4 whereby the luminescent layer 4 luminesces.

In case of an EL element having a relatively large surface area, the larger the distance from a pair of electrode terminals connected respectively to the back electrode 2 and the transparent conductive film 5, the higher the voltage drop. In order to prevent such voltage drop, conductive metal such as, for example, Ag or the like is deposited, by means of mask-printing or the like, onto the side of the transparent conductive film 5 which is in contact with the luminescent layer 4, to form an auxiliary electrode *5a*. The auxiliary electrode *5a* is bonded to the luminescent layer 4 by means of thermocompression bonding.

Thus, the auxiliary electrode *5a* enables a predetermined voltage to be applied substantially over the entire region of the transparent conductive film 5, so that the EL element 1 can luminesce uniformly over its entire surface.

If it is desired to manufacture a particularly elongated EL element, however, the following problems arise. That is, there is a limit in the dimension of a mask plate which is employed when the auxiliary electrode *5a* is formed on the transparent conductive film 5 by means of the mask-printing, so that it is difficult to manufacture an extremely elongated EL element. In this connection, it may be considered to utilize a printing apparatus which is capable of continuously printing the auxiliary electrode *5a*. However, such printing apparatus is expensive, resulting in an increase in the manufacturing cost of the EL element.

SUMMARY OF THE INVENTION

It is therefore an object of the invention to provide an elongated EL element capable of being manufactured easily and at low cost.

It is another object of the invention to provide a method of manufacturing the elongated EL element.

According to the invention, there is provided an elongated EL element comprising:

an elongated substrate having a back electrode, an insulating layer and a luminescent layer which are superimposed upon each other with the insulating layer positioned between the back electrode and the luminescent layer;

an elongated transparent conductive film superimposed upon the substrate in parallel relation thereto, wherein the luminescent layer of the substrate is in contact with the transparent conductive film;

an elongated auxiliary electrode having its width narrower than that of each of the substrate and the transparent conductive film, the auxiliary electrode having an insulating film, a conductive metal layer and a conductive adhesive layer which are superimposed upon each other with the conductive metal layer positioned between the insulating film and the conductive adhesive layer, the auxiliary electrode being sandwiched between the substrate and the transparent conductive film superimposed one upon the other and extending longitudinally of the substrate and the transparent conductive film, wherein the insulting film is in contact with the luminescent layer of the substrate, while the conductive adhesive layer is bonded to the transparent conductive film; and dampproof film means with which an assembly of the substrate, the transparent conductive film and the auxiliary electrode is covered in a sealed fashion.

According to the invention, there is also provided a method of manufacturing an elongated EL element, comprising the steps of:

preparing a substrate in the form of a continuous web having a back electrode, an insulating layer and a luminescent layer which are superimposed upon each other with the insulating layer positioned between the back electrode and the luminescent layer, a transparent conductive film in the form of a continuous web, and an auxiliary electrode having a width narrower than that of each of the substrate and the transparent conductive film, the auxiliary electrode being in the form of a continuous tape having an insulating film, an conductive metal layer and a conductive adhesion layer which are superimposed upon each other with the conductive metal layer postioned between the insulating film and the conductive adhesive layer;

superimposing the substrate and the transparent conductive film one upon the other with their respective longitudinal axes extending parallel to each other, while sandwiching the auxiliary electrode between the substrate and the transparent conductive film such that the auxiliary electrode extends longitudinally of the substrate and the transparent conductive film, wherein the luminescent layer of the substrate is in contact with the transparent conductive film, and wherein the insulating film of the auxiliary electrode is in contact with the luminescent layer of the substrate, while the conductive adhesive layer of the auxiliary electrode is in contact with the transparent conductive film;

applying heat and pressure to the superimposed substrate and transparent conductive film with the auxiliary electrode sandwiched therebetween, to thermocompression-bond the superimposed substrate and transparent conductive film to each other and to bond the conductive adhesive layer of the auxiliary electrode to the transparent conductive film;

covering an assembly of the substrate, the transparent conductive film and the auxiliary electrode with dampproof film material in a sealed fashion; and cutting the assembly covered with the dampproof means, into a predetermined length to form the elongated EL element.

In the invention, the auxiliary electrode sandwiched between the substrate and the transparent conductive film has the conductive metal layer on the insulating film. By the conductive metal layer, it is made possible to obtain higher conductivity as compared with the conventional auxiliary electrode which is formed, by the mask-printing or the like, on the side of the transparent conductive film which is in contact with the luminescent layer of the substrate. Further, the conductive adhesive layer on the conductive metal layer of the auxiliary electrode can ensure that the auxiliary electrode is electrically connected to the transparent conductive film. Accordingly, even if the elongated EL element is long extremely, the voltage drop can effectively be minimized so that luminescence of the EL element is made more uniform over its entire surface.

Preferably, the back electrode of the substrate is formed of a softened aluminum foil. Because of the softened aluminum foil, the thickness of the auxiliary electrode, which projects, toward the substrate, from the side of the transparent conductive film in contact with the luminescent layer, deforms an area of the substrate corresponding to the thickness of the auxiliary electrode. Thus, the thickness of the auxiliary electrode can be absorbed by the substrate so that the transparent conductive film is made substantially planar. This makes it possible to effectively prevent cracks from being developed in the transparent conductive film when the substrate and the transparent conductive film are thermocompression-bonded to each other.

DETAILED DESCRIPTION

Figure 1:
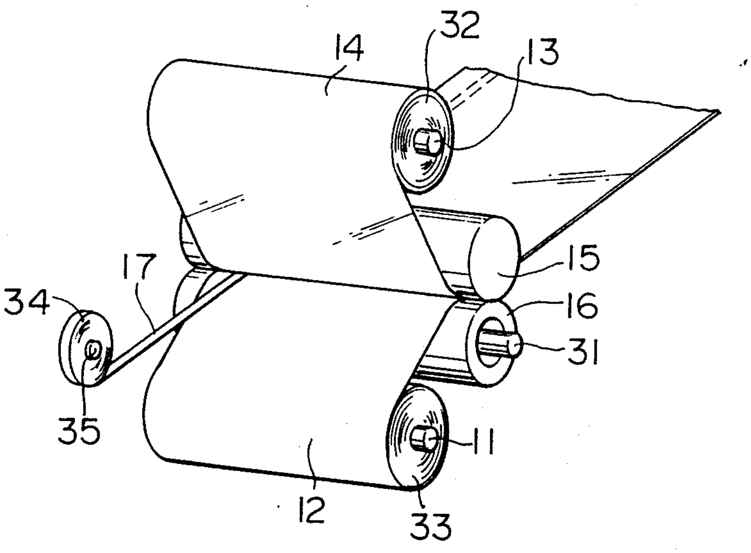
FIG. 1 is a somewhat diagrammatic perspective view of an arrangement for carrying out a manufacturing method according to the invention.

Referring to FIG. 1, there is shown an arrangement for carrying out a method of manufacturing an elongated EL (electroluminescence) element according to an embodiment of the invention. The arrangement comprises a pair of rollers 15 and 16 which cooperate with each other to define a nip therebetween. The pair of rollers 15 and 16 are arranged in such a manner that axes of the respective rollers 15 and 16 extend parallel to each other in a common plane. The roller 16 is hollow, and a heater 31 is arranged along the axis of the roller 16 for heating the same. The pair of rollers 15 and 16 are pressed against each other at the nip with a predetermined pressure.

Figure 4:
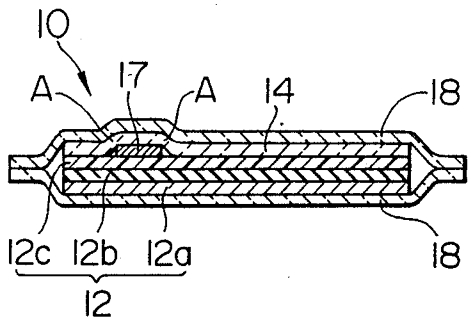
FIG. 4 is an enlarged cross-sectional view of an elongated EL element manufactured by the method according to the invention.

A substrate 12 is prepared which is in the form of a continuous web wound into a roll 32 about a core 13. As shown in FIG. 4, the substrate 12 has a back electrode **12*a*, an insulating layer 12*b* and a luminescent layer 12*c* which are superimposed upon each other whith the insulating layer 12*b* positioned between the back electrode 12*a* and the luminescent layer 12*c*. The back electrode 12*a*** is formed of, for example, an aluminum foil or the like.

Referring back to FIG. 1, a transparent conductive film 14 is prepared which is in the form of a continuous web wound into a roll 33 about a core 11.

Figure 2:
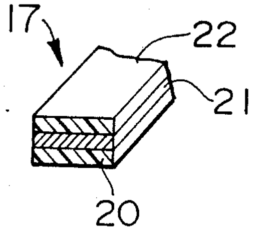
FIG. 2 is an enlarged fragmentary cross-sectional perspective view of an auxiliary electrode in the form of a tape illustrated in FIG. 1.

An auxiliary electrode 17 is also prepared which has a width cut beforehand into a predetermined value smaller than the width of each of the substrate 12 and the transparent conductive film 14. The auxiliary electrode 17 is in the form of a continuous tape wound into a roll 34 about a shaft 35. As shown in FIG. 2, the auxiliary electrode 17 has an insulating film 20, an conductive metal layer 21 and a conductive adhesive layer 22 which are superimposed upon each other with the conductive metal layer 21 positioned between the insulating film 20 and the conductive adhesive layer 22. The insulating film 20 is formed of, for example, PET (polyethylene terephthalate) resin. The conductive metal layer 21 is formed of Al, Cu or the like and is vacuum-deposited or laminated onto the insulating film 20. The conductive adhesive layer 22 is formed of conductive adhesive coated on the conductive metal layer 21. The conductive adhesive may be pressure-sensitive adhesive or thermoplastic adhesive.

The substrate 12 is unwound from the roll 32 and is fed toward the nip between the pair of rollers 15 and 16. The transparent conductive film 14 is also unwound from the roll 33 and is fed toward the nip between the pair of rollers 15 and 16. Likewise, the auxiliary electrode 17 is unwound from the roll 34 and is fed toward the nip between the pair of rollers 15 and 16. The unwound substrate 12 and the unwound transparent conductive film 14 are superimposed in parallel relation one upon the other at the nip between the pair of rollers 15 and 16, while sandwiching the unwound auxiliary electrode 17, at the nip, between the substrate 12 and the transparent conductive film 14. At the superimposing, the luminescent layer **12*c* of the substrate 12 is in contact with the transparent conductive film 14. Further, the insulating film 20 of the auxiliary electrode 17 is in contact with the luminescent layer 12*c* of the substrate, while the conductive adhesive layer 22 of the auxiliary electrode 17 is in contact with the transparent conductive film 14. As clearly shown in FIGS. 1 and 3, the auxiliary electrode 17 extends along one side edges of the respective substrate and transparent conductive film 12 and 14**.

The pair of rollers 15 and 16 apply heat and pressure to the superimposed substrate and transparent conductive film 12 and 14 with the auxiliary electrode 17 sandwiched therebetween, to thermocompression-bond the superimposed substrate and transparent conductive film 12 and 14 to each other and to bond the conductive adhesive layer 22 of the auxiliary electrode 17 to the transparent conductive film 14.

Subsequently, as shown in FIG. 4, an assembly of the substrate 12, the transparent conductive film 14 and the auxiliary electrode 17 is covered with a pair of dampproof films 18 and 18 in a sealed fashion by means of thermocompression-bonding or the like.

Figure 3:
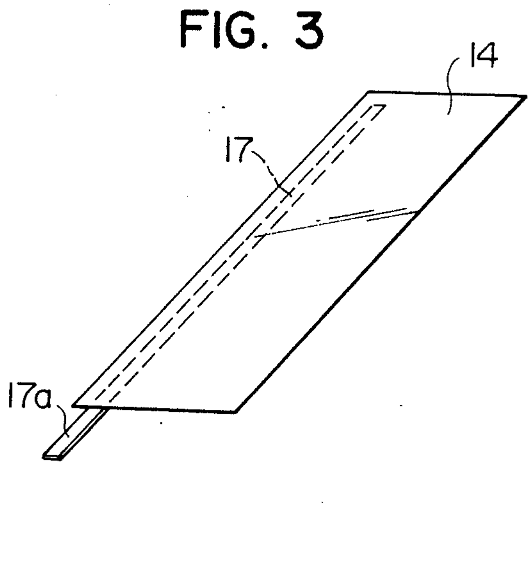
FIG. 3 is a perspective view of a transparent conductive film and the auxiliary electrode illustrated in FIG. 1, showing a lead terminal of the auxiliary electrode which projects from one end of the transparent conductive film.

Finally, the above-mentioned assembly covered with the pair of dampproof films 18 and 18 is cut into a predetermined length. Thus, an elongated EL element is formed as shown in FIG. 4. At the cutting, the auxiliary electrode 17 is cut into a predetermined length longer than that of each of the substrate 12 and the transparent conductive film 14 so that the auxiliary electrode 17 has its one end portion projecting from one ends of the respective substrate and transparent conductive film 12 and 14, as shown in FIG. 3. The one end portion of the auxiliary electrode 17 serves as a lead terminal 17*a*. Thus, it can be dispensed with that a pair of lead terminals separate from the substrate 12 and the transparent conductive film 14 are connected respectively to the substrate 12 and the transparent conductive film 14.

Since, as clearly seen from FIG. 4, the auxiliary electrode 17 is relatively thick and the back electrode 12*a* of the substrate 12 is relatively hard in material such as, for example, IN 30 H (JIS), the thickness of the auxiliary electrode 17 causes an area of the transparent conductive film 14 corresponding to the thickness of the auxiliary electrode 17, to project or deform away from the substrate 12. Thus, cracks may be developed at regions A and A of the transparent conductive film 14 which extend along the opposite side edges of the auxiliary electrode 17.

Figure 5:
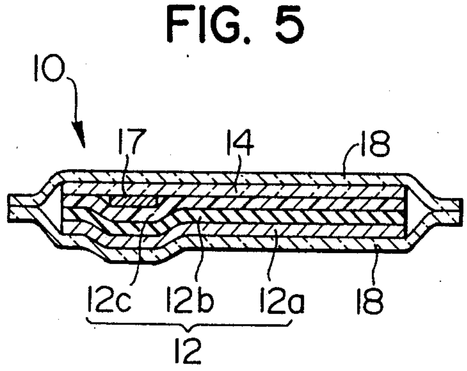
FIG. 5 is a view similar to FIG. 4, but showing a modification of the elongated EL element according to the invention.
Figure 6:
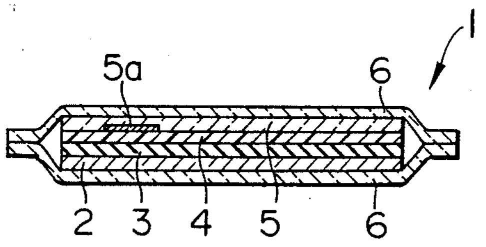
FIG. 6 PRIOR ART
FIG. 6 is an enlarged cross-sectional view of the conventional EL element.

FIG. 5 shows a modified elongated EL element which can effectively prevent the cracks described above. Specifically, the back electrode 12*a* of the substrate 12 is formed of a softened aluminum foil such as, for example, IN 30 O (JIS) or the like. Because of the softened aluminum foil, the thickness of the auxiliary electrode 17, which projects, toward the substrate 12, from the side of the transparent conductive film 14 in contact with the luminescent layer 12*c*, deforms an area of the substrate 12 corresponding to the thickness of the auxiliary electrode 17, as shown in FIG. 5. Thus, thickeness of the auxiliary electrode 17 can be absorbed by the substrate 12 so that the transparent conductive film 14 is made substantially planar. This makes it possible to effectively prevent cracks from being developed in the transparent conductive film 14 when the substrate 12 and the transparent conductive film 14 are thermocompression-bonded to each other.

What is claimed is:

1. A method of manufacturing an elongated EL element, comprising the steps of:

preparing a substrate in the form of a continuous web having a back electrode, an insulating layer and a luminescent layer which are superimposed upon each other with said insulating layer positioned between said back electrode and said luminescent layer, a transparent conductive film in the form of a continuous web, and an auxiliary electrode having a width narrower, than that of each of said substrate and said transparent conductive film, said auxiliary electrode being in the form of a continuous tape having and insulating film, an conductive metal layer and a conductive adhesion layer which are superimposed upon each other with said conductive metal layer positioned between said insulating film and said conductive adhesive layer;

superimposing said substrate and said transparent conductive film one upon the other with their respective longitudinal axes extending parallel to each other, while sandwiching said auxiliary electrode between said substrate and said transparent conductive film such that said auxiliary electrode extends longitudinally of said substrate and said transparent conductive film, wherein said luminescent layer of said substrate is in contact with said transparent conductive film, and wherein said insulating film of said auxiliary electrode is in contact with said luminescent layer of said substrate, while said conductive adhesive layer of said auxiliary electrode is in contact with said transparent conductive film;

applying heat and pressure to the superimposed substrate and transparent conductive film with said auxiliary electrode sandwiched therebetween, to thermocompression-bond the superimposed substrate and transparent conductive film to each other and to bond said conductive adhesive layer of said auxiliary electrode to said transparent conductive film;

covering an assembly of said substrate, said transparent conductive film and said auxiliary electrode with dampproof film material in a sealed fashion; and cutting said assembly covered with said dampproof film material, into predetermined length to form the elongated EL element.

2. A method according to claim 1, including the step of preparing a pair of rollers cooperating with each other to define a nip therebetween, wherein at said superimposing step, said substrate and said transparent conductive film are superimposed one upon the other at said nip while sandwiching said auxiliary electrode between said substrate and said transparent conductive film at said nip.

3. A method according to claim 2, wherein said applying step is carried out by said pair of rollers.

4. A method according to claim 2, wherein said susbstrate in the form of a continuous web is wound into a roll, and said transparent conductive film in the form of a continuous web is also wound into a roll, and wherein said method includes the steps of unwinding said substrate from its roll to feed the unwound substrate toward said nip, and unwinding said transparent conductive film from its roll to feed the unwound transparent conductive film toward said nip, the unwound substrate and the unwound transparent conductive film being superimposed one upon the other at said nip.

5. A method according to claim 4, wherein said auxiliary electrode in the form of a continuous tape is wound into a roll, and wherein said method includes the step of unwinding said auxiliary electrode from its roll to feed the unwound auxiliary electrode toward said nip to sandwich the unwound auxiliary electrode between said substrate and said transparent conductive film at said nip.

6. A method according to claim 1, wherein said conductive metal layer of said auxiliary electrode is vacuum-deposited on said insulating film.

7. A method according to claim 1, wherein said conductive metal layer of said auxiliary electrode is laminated on said insulating film.

8. A method according to claim 1, wherein said conductive metal layer of said auxiliary electrode has its one side is contact with said insulating film, and wherein said conductive adhesive layer of said auxiliary electrode is formed of conductive adhesive coated on the other side of said conductive metal layer.

9. A method according to claim 1, wherein said back electrode of said substrate is formed of an aluminum foil, and wherein said auxiliary electrode has its thickness which is absorbed by said transparent conductive film at said applying step so that said substrate is made substantially planar.

10. A method according to claim 1, wherein said back electrode of said substrate is formed of a softened aluminum foil, and wherein said auxiliary electrode has its thickness which is absorbed by said substrate at said applying step so that said transparent conductive film is made substantially planar.

11. A method according to claim 1, wherein at said cutting step, said auxiliary electrode is cut into a predetermined length longer than that of each of said substrate and said transparent conductive film so that said auxiliary electrode has its one end portion projecting from one ends of the respective substrate and transparent conductive film, said one end portion of said auxiliary electrode serving as a lead terminal.

12. A method according to claim 1, wherein said auxiliary electrode extends along one side edges of the respective substrate and transparent conductive film.

* * * * *